(12) United States Patent
Ouellette et al.

(10) Patent No.: US 11,432,911 B2
(45) Date of Patent: Sep. 6, 2022

(54) INTEGRATED BRACES WITH VENEERS, CROWNS, OR BRIDGES

(71) Applicant: Paul Ouellette, Atlanta, GA (US)

(72) Inventors: Paul Ouellette, Merritt Island, FL (US); Arlen J. Hurt, Gainesville, GA (US)

(73) Assignee: Paul Ouellette, Atlanta, GA (US)

( * ) Notice: Subject to any disclaimer, the term of this patent is extended or adjusted under 35 U.S.C. 154(b) by 769 days.

(21) Appl. No.: 14/881,422

(22) Filed: Oct. 13, 2015

(65) Prior Publication Data
US 2016/0206403 A1 Jul. 21, 2016
US 2020/0214805 A9 Jul. 9, 2020

Related U.S. Application Data

(60) Provisional application No. 62/105,860, filed on Jan. 21, 2015, provisional application No. 62/063,539, filed on Oct. 14, 2014.

(51) Int. Cl.
| | |
|---|---|
| *A61C 7/14* | (2006.01) |
| *A61C 8/00* | (2006.01) |
| *A61C 13/00* | (2006.01) |
| *A61C 7/00* | (2006.01) |
| *A61C 5/77* | (2017.01) |
| *A61C 19/04* | (2006.01) |

(52) U.S. Cl.
CPC ............ *A61C 7/146* (2013.01); *A61C 5/77* (2017.02); *A61C 7/002* (2013.01); *A61C 7/14* (2013.01); *A61C 8/0096* (2013.01); *A61C 13/0013* (2013.01); *A61C 19/04* (2013.01)

(58) Field of Classification Search
CPC .. A61C 7/146; A61C 5/70; A61C 5/73; A61C 5/77; A61C 5/20; A61C 5/30; A61C 8/0096; A61C 7/14–34; A61C 7/143

USPC .............................................................. 433/9
See application file for complete search history.

(56) References Cited

U.S. PATENT DOCUMENTS 3,760,502 A 9/1973 Hirsch
3,765,091 A * 10/1973 Northcutt ................. A61C 7/12
433/9

(Continued)

FOREIGN PATENT DOCUMENTS

KR 200331534 Y1 * 11/2003

OTHER PUBLICATIONS

"Graduated." Merriam-Webster.com Dictionary, Merriam-Webster, https://www.merriam-webster.com/dictionary/graduated. Accessed Oct. 26, 2021. (Year: 2021).*

*Primary Examiner* — Jacqueline T Johanas
*Assistant Examiner* — Shannel Nicole Belk
(74) *Attorney, Agent, or Firm* — Maxine L. Barasch; Dreamweaver Law, PLLC

(57) ABSTRACT

A dental appliance comprising a veneer, bridge, or crown with an integrated brace together formed as a single piece of material. The braces, crowns, veneers, and bridges may be printed with 3-dimensional (3D) software and SLA milling. Embodiments of the present invention provide the printed veneer, crown or bridge with an orthodontic portion ("brace" or "bracket") that is all one piece. This can be used to move teeth orthodontically and provide a degree of esthetics. The appliance may include identification marks, which may guide placement of the appliance in a patient's mouth. The brace and identification marks can be removed, leaving the veneer, crown, or bridge behind.

22 Claims, 17 Drawing Sheets

(56) References Cited

U.S. PATENT DOCUMENTS

| | | | | |
|---|---|---|---|---|
| 3,775,850 A | * | 12/1973 | Northcutt | A61C 7/12 433/16 |
| 3,835,538 A | * | 9/1974 | Northcutt | A61C 7/12 433/24 |
| 3,936,939 A | * | 2/1976 | Faunce | A61C 7/12 433/9 |
| 4,284,405 A | | 8/1981 | Dellinger | |
| 4,470,809 A | | 9/1984 | Klepacki | |
| 4,527,975 A | | 7/1985 | Ghafari et al. | |
| 5,082,442 A | * | 1/1992 | Rosen | A61C 7/12 433/17 |
| 5,232,364 A | * | 8/1993 | Rosen | A61C 7/00 433/9 |
| 5,492,471 A | | 2/1996 | Singer | |
| 5,931,667 A | * | 8/1999 | Papandreas | A61C 7/12 433/8 |
| 5,993,206 A | * | 11/1999 | Andreiko | A61C 7/146 433/24 |
| 6,776,614 B2 | * | 8/2004 | Wiechmann | A61C 7/20 433/24 |
| 8,215,953 B2 | * | 7/2012 | Shirasuka | A61C 7/146 433/9 |
| 9,629,696 B2 | | 4/2017 | Ouellette | |
| 2002/0150857 A1 | * | 10/2002 | Orikasa | A61C 7/00 433/8 |
| 2003/0152884 A1 | * | 8/2003 | Wiechmann | A61C 7/145 433/9 |
| 2005/0239013 A1 | * | 10/2005 | Sachdeva | A61C 3/00 433/24 |
| 2007/0298381 A1 | * | 12/2007 | Collodoro | A61C 5/20 433/215 |
| 2009/0176182 A1 | | 7/2009 | Carrillo Fuentevilla | |
| 2009/0319068 A1 | * | 12/2009 | Sager | G16H 50/50 700/98 |
| 2010/0003632 A1 | * | 1/2010 | Ruiz Diaz | A61C 7/287 433/11 |
| 2013/0230817 A1 | * | 9/2013 | Kabbani | A61C 7/14 433/3 |
| 2014/0011154 A1 | * | 1/2014 | Curiel | A61C 7/145 433/10 |
| 2014/0065568 A1 | * | 3/2014 | Rahimi | A61C 7/20 433/9 |
| 2014/0178828 A1 | * | 6/2014 | Jo | A61C 7/146 433/3 |
| 2014/0178830 A1 | * | 6/2014 | Widu | A61C 7/08 433/6 |
| 2014/0205969 A1 | | 7/2014 | Marlin | |
| 2014/0363788 A1 | | 12/2014 | Ouellette | |
| 2016/0206405 A1 | * | 7/2016 | Reybrouck | A61C 7/12 |

* cited by examiner

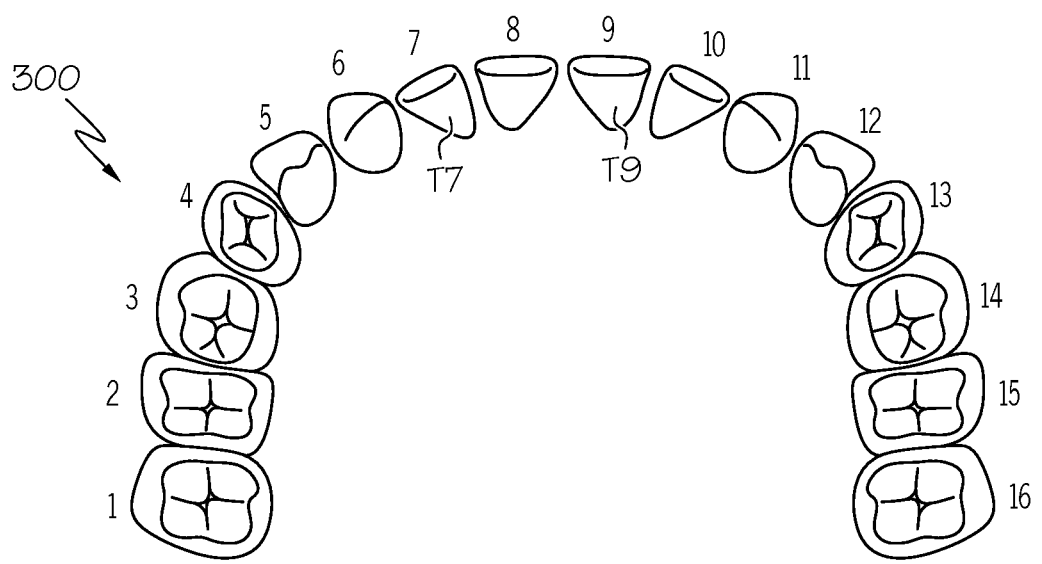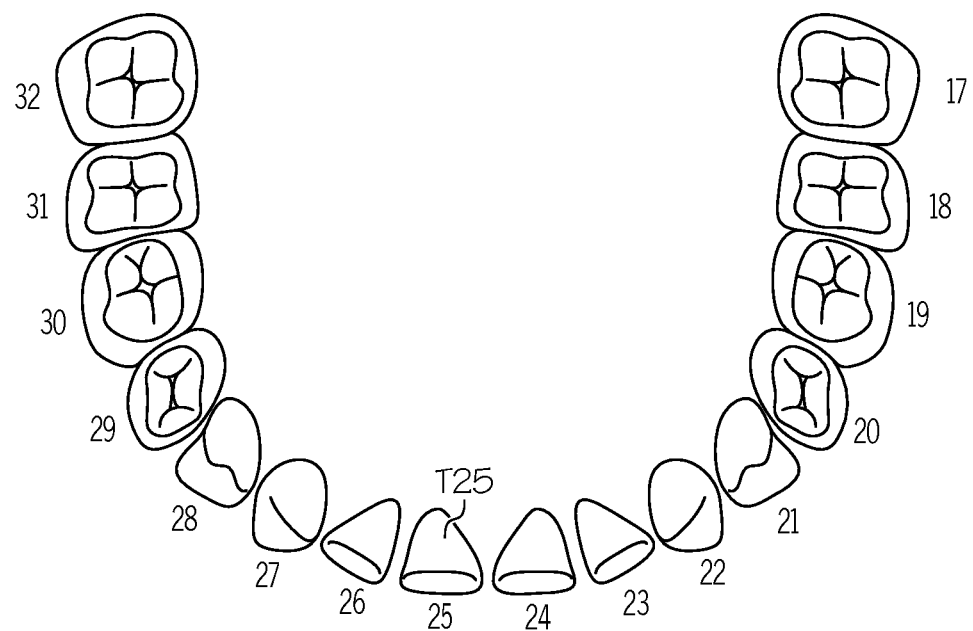
FIG. 3

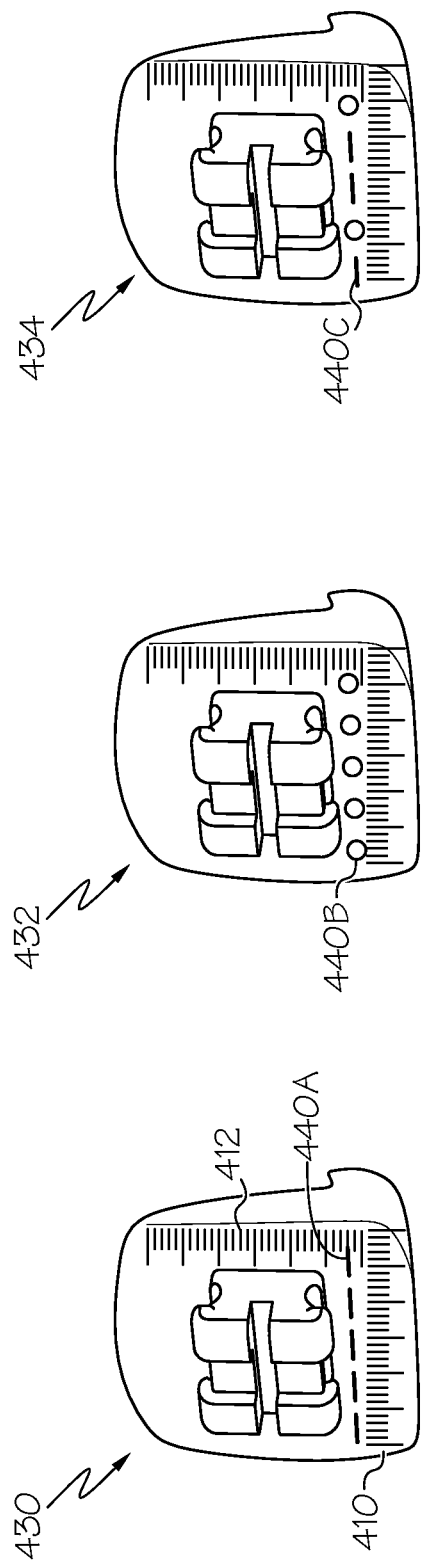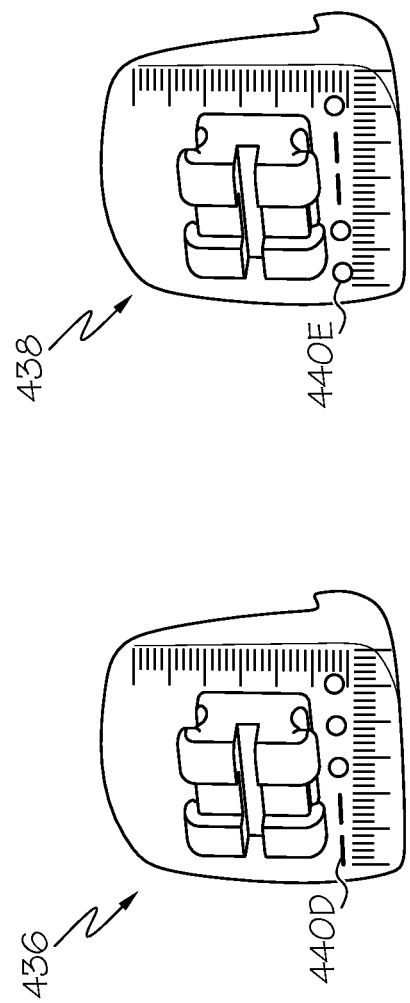

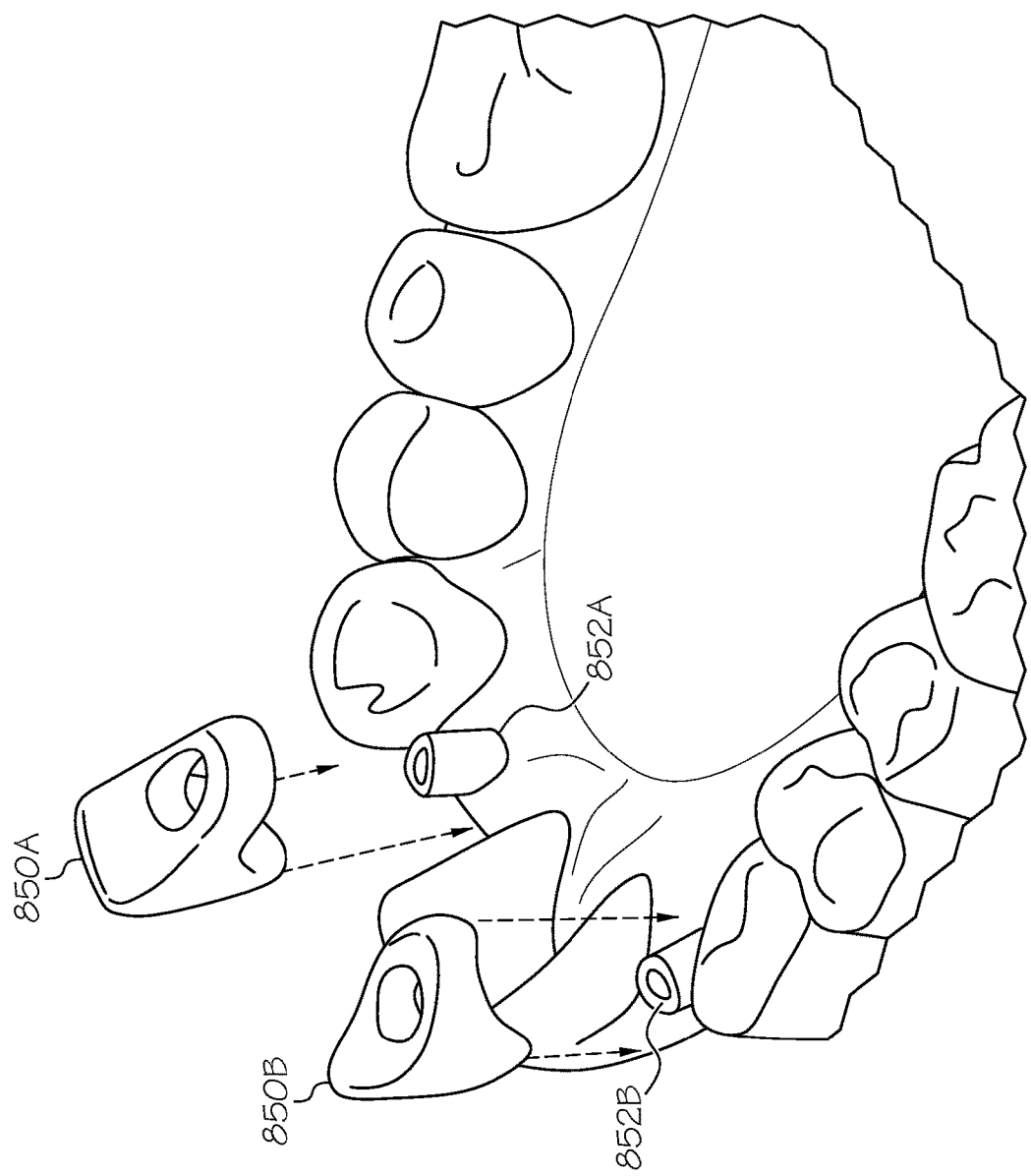

INTEGRATED BRACES WITH VENEERS, CROWNS, OR BRIDGES

CROSS-REFERENCE TO RELATED APPLICATIONS

This application claims priority to U.S. provisional patent application Ser. No. 62/063,539 filed on Oct. 14, 2014, and U.S. provisional patent application Ser. No. 62/105,860 filed Jan. 21, 2015, the contents of both of which are incorporated herein by reference.

FIELD OF THE INVENTION

The present invention relates generally to dentistry, and more particularly to integrated braces and veneers, crowns, or bridges.

BACKGROUND

Often, in the field of dentistry, a patient will have one or more teeth that he or she will consider aesthetically unpleasing. These teeth are often the visible teeth and/or front teeth that may present one or more issues, such as discoloration, alignment issues, and issues with the teeth themselves (e.g. chipping, etc.).

Various solutions are currently employed for remedying some of these issues. In the case of discoloration, techniques may include bleaching the tooth or teeth at issue, or covering such tooth or teeth with a veneer or crown. For issues of alignment, orthodontic fixtures or appliances may be applied to one or more teeth to aid in straightening of the teeth.

In a way, cosmetic dentistry is as much an art as it is a science. There are many subjective factors to consider. For example, the color of the completed restoration is a function of the color and opacity of the dentin, and enamel layers of the porcelain, the color of the metal substructure, and the color of the bonding agent in cases where it is used. In some cases, careful use of color and texture is necessary to obtain realistic looking veneers or crowns. It is undesirable to produce veneers, crowns or bridges that look unnatural when compared to the natural translucency of human teeth. This is particularly true in cases where very thin restorations are used.

A cover, veneer, crown, or bridge on the surface of a tooth allows for altering both its color shade and shape. The dentist generally possesses an array of composite resin restorative materials of various shades with which to apply to the tooth for the purpose of shade and/or anatomical alteration of the prepared tooth. Typically, the dentist will dispense the appropriate shade and quantity of resin, and apply the dispensed mass directly to the prepared tooth and proceed to tamp down the mass to a uniform thickness while simultaneously manipulating the mass to conform to the outline of the prepared tooth. Accordingly, several methods of tooth restoration can be applied to treat various medical and/or aesthetic issues associated with teeth.

Orthodontics is a branch of dentistry that provides a variety of treatments for people who suffer from malocclusion or who are not satisfied with their looks because of tooth irregularity, disproportionate jaw relationships, or both. Furthermore, orthodontic issues can extend beyond aesthetics, and have genuine medical ramifications, such as issues pertaining to digestion and absorption of nutrients, as well as speech issues, such as inhibiting correct pronunciation. Hence, orthodontic and cosmetic dentistry are intertwined to a certain extent. It is therefore desirable to have improvements in orthodontic and cosmetic dentistry.

SUMMARY

In embodiments of the present invention, braces, crowns, veneers, and bridges are printed with 3-dimensional (3D) software and stereolithic SLA milling. Embodiments of the present invention provide the printed veneer, crown or bridge with an orthodontic portion ("brace") that is all one piece. This can be used to move teeth orthodontically and provide a degree of esthetics, since the color of the veneer, crown or bridge can be matched to the patient's tooth color. Embodiments use stainless steel, tooth colored, gold colored, or clear orthodontic wires for improved esthetics. The brace can be removed, leaving the veneer, crown, or bridge behind.

Embodiments of the present invention provide orthodontic veneers, crowns, and bridges using 3-dimensional (3D) stereolithic (SLA) print technology and/or 3D milling. The system interfaces with software programs that allow a user to design a customized orthodontic treatment protocol (design braces on the computer) that can be printed on an in-office 3D printer or manufactured by a dental/orthodontic laboratory. The orthodontic veneers or crowns are used to orthodontically move teeth into corrected positions when setting up proper spacing for implants, bridges, and other dental restorative procedures.

In embodiments, the brace portion (orthodontic) and veneer, crown, or bridge portion is printed out of the same tooth-colored material. One single piece includes the veneer, crown, or bridge portion plus the brace portion. When the user completes the orthodontic modification (straightening the teeth), the veneer, crown, or bridge can be left in place to also help retain the correction (fixed wire retention using the veneers, crowns, or bridges).

After correction, the doctor may remove the brace portion (the orthodontic portion only) from the veneer, crown, or bridge portion with, e.g., a rotary tool. The veneer or crown surface is characterized by the doctor and re-glazed with an orthodontic resin to create an esthetic smooth and anatomically correct veneer, crown, or bridge surface. When the patient has the financial ability, orthodontic veneers, crowns, or bridges can be completely removed to be replaced with permanent veneers, crowns, or bridges (if the case requires this).

Another advantage of provided embodiments is that orthodontists no longer need to carry a large inventory of orthodontic brackets. The doctor scans the teeth or model of the teeth with an optical scanner, e.g., 3M True Definition's Intraoral Scanner (St. Paul, Minn.), designs his or her case with computer software, and prints the veneers with (typically an in-office 3D printer). This is a breakthrough technology, a paradigm shift in thinking. With embodiments of the present invention, orthodontists and general dentists will be able to print orthodontic appliances to develop implant sites. Orthodontists will also be able to customize appliance systems using this technology.

BRIEF DESCRIPTION OF THE DRAWINGS

The accompanying drawings, which are incorporated in and constitute a part of this specification, illustrate several embodiments of the present teachings, and, together with the description, serve to explain the principles of the present teachings.

FIG. 3 shows an exemplary tooth identification chart.

FIGS. 4A-4E show embodiments comprising exemplary identification marks in accordance with embodiments of the present invention.

FIG. 8C shows a diagram of installation of crowns over prepared teeth in accordance with embodiments of the present invention.

Figure 1C:
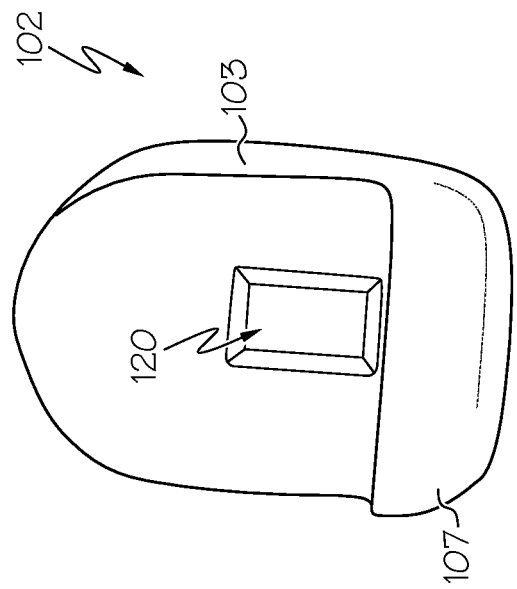
FIG. 1C shows a back view of a veneer in accordance with embodiments of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

Reference throughout this specification to "one embodiment," "an embodiment," "embodiments," "exemplary embodiments," "some embodiments," or similar language means that a particular feature, structure, or characteristic described in connection with the embodiment is included in at least one embodiment of the present invention. Thus, appearances of the phrases "in one embodiment," "in an embodiment," "in some embodiments," "in embodiments" and similar language throughout this specification may, but do not necessarily all refer to the same embodiment.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Features, regions, integers, steps, operations, elements, and/or components of an embodiment can be mixed and matched with features, regions, integers, steps, operations, elements, and/ or components of one or more other embodiments.

The terms, "brace" and "bracket" are used interchangeably throughout, and are meant to mean the orthodontic portion to which wire, rubber bands, or other orthodontic appliances are attached to the veneer, crown, or bridge. In some applications, "attachment" can also be used in place of "brace" or "bracket". The terms, "user", "dentist", and "doctor" are also used interchangeably throughout, and are meant to mean the professional whom designs, prepares, and/or installs the veneers, crowns, or bridges of the present invention.

Figure 1B:
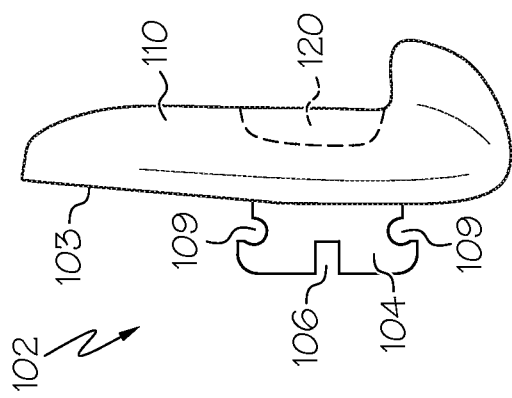
FIG. 1B shows a side perspective view of a veneer in accordance with embodiments of the present invention.
Figure 1A:
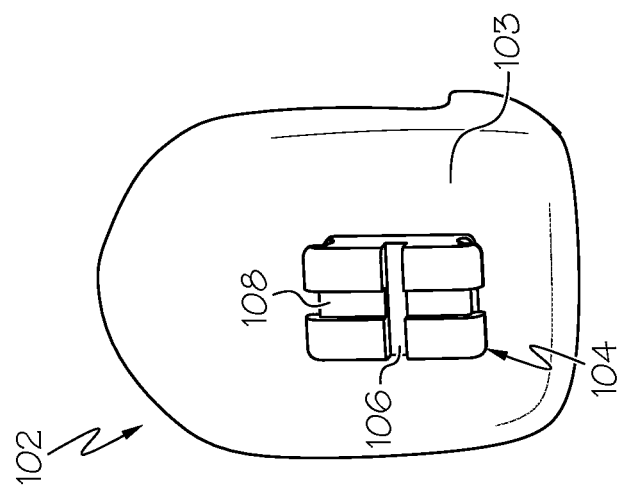
FIG. 1A shows a front view of a veneer in accordance with embodiments of the present invention.

FIGS. 1A-1C shows a veneer 102 in accordance with embodiments of the present invention. A veneer 102 may cover a tooth's front surface and sides surfaces, and may wraps over or under to cover an incisal edge of the tooth. See FIG. 1C. In some embodiments, the veneer 102 covers (a larger portion of) the back side of a tooth. The veneer 102 comprises a tooth portion 103 (since it looks like a tooth) and a brace (orthodontic) portion 104. The tooth portion 103 can extend around to "cup" the prepared tooth when installed, as shown at 107. In some embodiments, lingual braces can be included on such back portion 107 of the tooth portion 103. The brace portion 104 is comprised of the same material as the tooth portion, and is fabricated as a single contiguous piece. As shown in FIGS. 1B and 1C, the veneer may comprise one or more indentations on its backside as one or more bonding adhesive reservoirs 120 for adhesive to flow into to better hold the veneer to a tooth. In some embodiments, the reservoir may extend into the brace (not shown). In such embodiments, a tooth-colored adhesive may be used so that when the brace 104 is removed, any exposed adhesive will not be visible.

In the embodiment shown, brace portion 104 comprises the following. There is a horizontal channel 106, which may be used for securing orthodontic wires used for realignment of the teeth. Brace portion 104 may further comprise a vertical channel 108. An indentation 109 may be formed on the top and bottom of each brace portion 104, which may be used for securing of bands or other orthodontic devices. It should be recognized that this is an example brace—other brace configurations are included within the scope and spirit of the invention. The user has the option to add elastic hooks and unlimited other orthodontic features to the brace portion. The user is in control of the orthodontic design required for a particular case.

Figure 2:
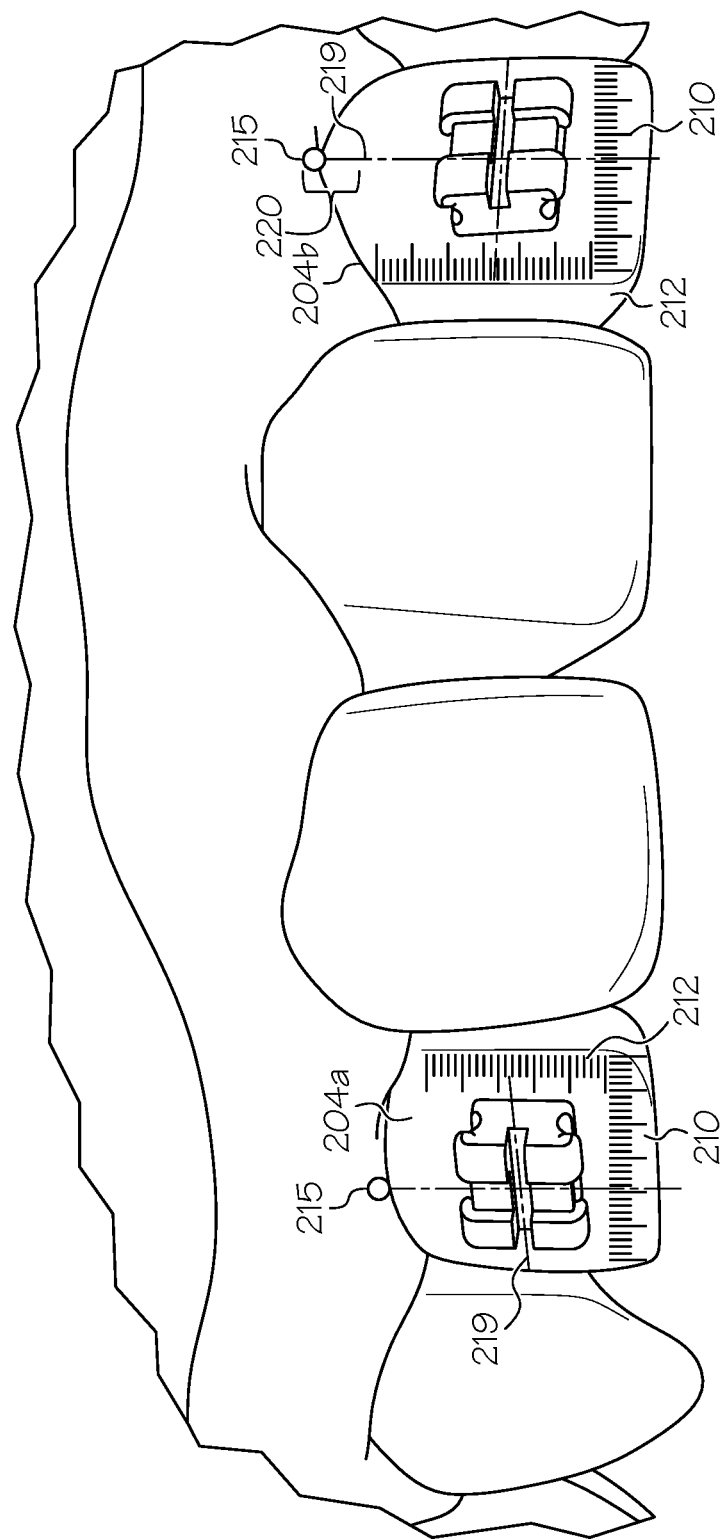
FIG. 2 shows veneers in accordance with embodiments of the present invention, having alignment marks.

FIG. 2 shows veneers in accordance with some embodiments of the present invention, showing alignment marks. Veneers 204a and 204b are shown having one or more horizontal axis alignment marks 210, and vertical axis alignment marks 212 at a 90 degree angle from the horizontal alignment markers. The alignment marks may be formed by the 3D printing or milling process, and may be in the form of raised (elevated) marks and/or indented (depressed) marks on a front or back side of a veneer. Alternatively, the marks can be printed on with ink or another material. If on the front, the marking would be substantially invisible to one looking at the patient as saliva would fill in the markings. If on the backside of the tooth, bonding adhesive would fill in the markings. The user would need the markers before placing the veneers (or crowns or bridges), not necessarily after. However, the vertical/horizontal markers and millimeter markers may be helpful after when treating the case.

The alignment marks can assist in tracking the movement of teeth over time as the orthodontic process progresses. In addition to the alignment marks 210 and 212, a zenith point 215 may also be indicated at the top of each tooth. In some embodiments, one or more veneers (e.g., 204a and 204b) may be used that do not have alignment marks. In some embodiments, a crosshair pattern 219 may be present. The crosshair pattern may serve to indicate to the dentist the location of the center of the veneer, so that the dentist can align it as desired (to a tooth). The cross hair marking may also be aligned with the zenith point of the crown, as shown at 220 on FIG. 2. The zenith of a tooth is the highest area at the top or bottom of a tooth when framed by the gum tissue. It may not coincide with the center of the tooth. It may be too slightly to the right or left of center.

FIG. 3 shows an exemplary tooth identification chart 300. Each tooth is indicated by a number. For example, three teeth are referenced for further discussion, tooth 7 (indicated as T7), tooth 9 (indicated as T9), and tooth 25 (indicated as T25). While chart 300 shows typical adult teeth, a comparable chart and identification system are used for juvenile teeth.

FIGS. 4A-4E show embodiments comprising exemplary identification marks in accordance with embodiments of the present invention. FIG. 4A shows veneer 430, which comprises vertical axis alignment marks 412 and horizontal axis alignment marks 410. Disposed above horizontal axis alignment marks 410 is tooth indicator 440A. In this embodiment, indicator 440A may be comprised of five individual marks that represent a binary coding system, hence 2^5=32 patterns are possible, where each pattern represents a tooth number. In this embodiment, the individual lines of indicator 440A represent a binary zero. FIG. 4B shows veneer 432, which comprises tooth indicator 440B. Each individual mark of tooth indicator 440B comprises a circle, which represents a binary 1. Hence, the decimal value indicated by indicator 440B is 31 in base 10 (decimal) numbering, which corresponds to tooth 31. Similarly, veneer 434 of FIG. 4C shows tooth indicator 440C, which represents a binary value of 01001b, which equals 9, and represents tooth T9. Similarly, veneer 436 of FIG. 4D shows tooth indicator 440D, which represents a binary value of 00111b, which equals 7, and represents tooth T7. Similarly, veneer 438 of FIG. 4E shows tooth indicator 440E, which represents a binary value of 11001b, which equals 25, and represents tooth T25. Referring again to veneer 430 of FIG. 4A, in embodiments, the binary value 00000b may be used to refer to tooth 32. The identification system can be useful during application of multiple veneers, to assist the dentist in keeping track of the veneers and ensuring that each veneer is installed on the proper tooth. Once installed, the tooth indicators may be removed (e.g., by filing or polishing) so that they are no longer visible on the veneer. Note that while the embodiments of FIGS. 4A-4E show alignment marks and tooth indicators, other embodiments may utilize tooth indicators such as 440A-440E without the use of horizontal axis alignment marks or vertical axis alignment marks.

Figure 5A:
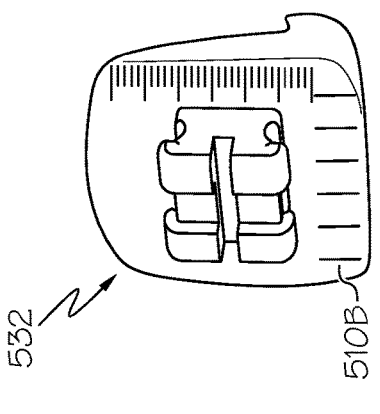
FIGS. 5A-5D show embodiments comprising exemplary combination marks in accordance with embodiments of the present invention.
Figure 5B:
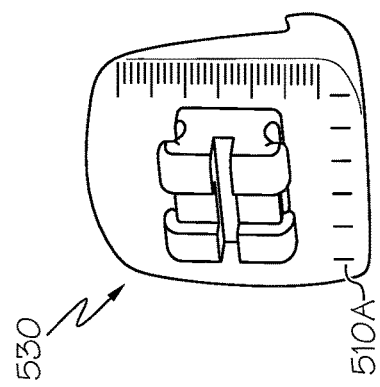
Figure 5C:
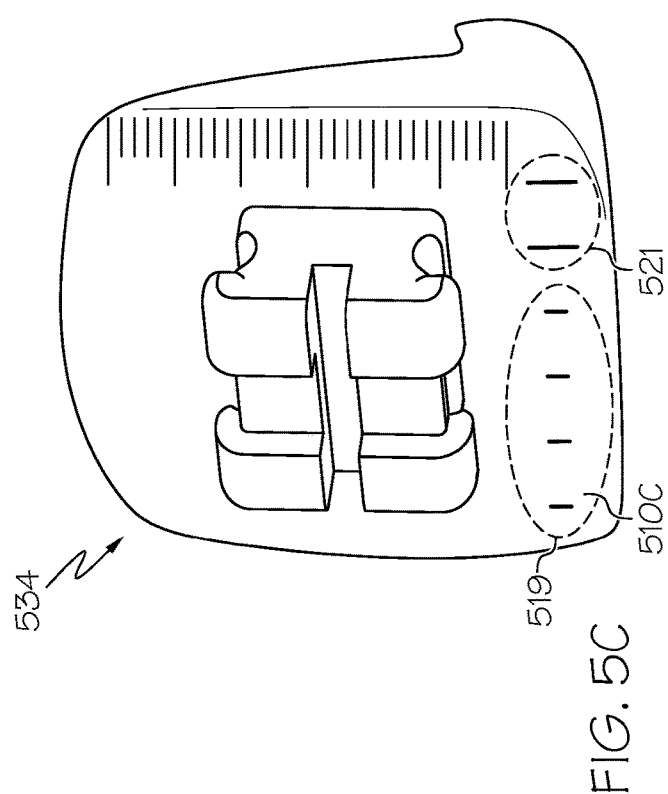

FIGS. 5A-5C show embodiments comprising exemplary combination marks in accordance with embodiments of the present invention. Combination marks serve as both horizontal axis alignment marks and tooth indicators. Referring now to FIG. 5A, veneer 530 is shown having vertical axis alignment marks 512 and tooth indicator 510A. Similarly, veneer 532 comprises tooth indicator 510B. Each combination mark of tooth indicator 510A is a short mark, and each mark of tooth indicator 510B is a long mark. For example, in embodiments, a short mark may be about 2 millimeters, and a long mark may be about 4 millimeters. These sizes are meant to serve as examples, and are non-limiting. In embodiments, a short mark indicates a binary 0 and a long mark indicates a binary 1. Hence, veneer 530 of FIG. 5A has a binary value of 00000b and veneer 532 of FIG. 5B has a binary value of 11111b. Referring now to veneer 534 of FIG. 5C, tooth indicator 510C has a mix of short and long combination marks. As can be seen, group 519 comprises short combination marks, and group 521 comprises long combination marks. Hence, as shown, tooth indicator 510C represents a binary value of 00011b, which equals 3, and represents tooth 3. By using the appropriate pattern of short and long combination marks, any tooth identification number may be represented. Additionally, the combination marks also serve as horizontal axis alignment marks for tracking tooth movement.

Figure 5D:
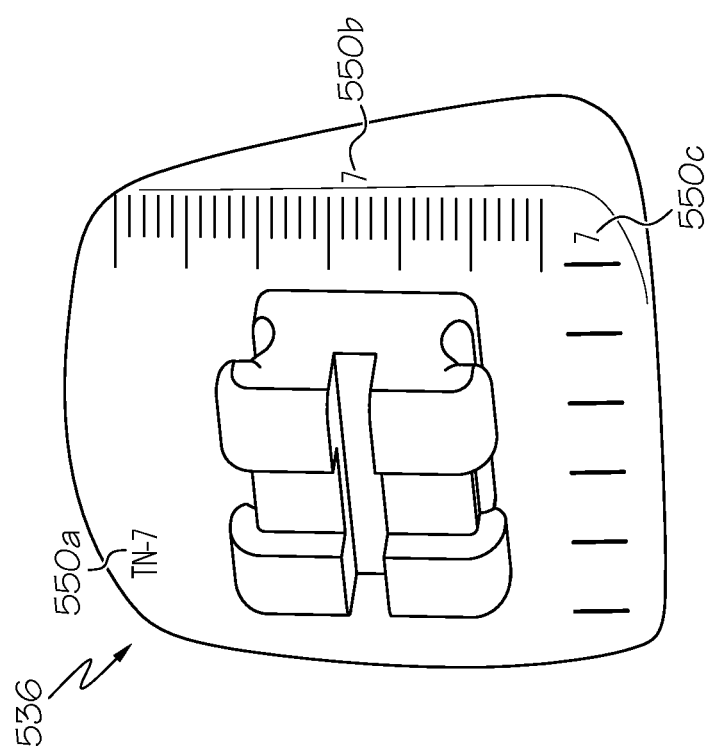

FIG. 5D shows an alternate embodiment of the veneer 536 in which, instead of the binary system, the tooth number is inscribed on the veneer, as shown at 550a, 550b, and 550c. A doctor could use one of the three Dental Numbering Systems: 1.) Universal Numbering System (i.e. teeth labeled "1"-"32"); 2.) Palmer Notation Numbering System; 3.) Federation Dentaire Internationale Numbering System (FDI). The numbers could be added to the inside or outside surface of the veneers (or crowns or bridges) as identifiers.

Figure 6:
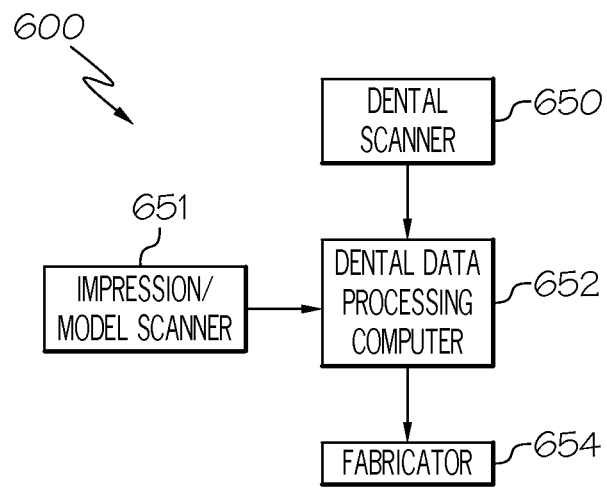
FIG. 6 is a block diagram of a system in accordance with embodiments of the present invention.

FIG. 6 is a block diagram of a system 600 in accordance with embodiments of the present invention. System 600 comprises dental scanner 650, which, in some embodiments, may be an intra-oral or tabletop box scanner. Thus, in some cases the system may scan the patient's tooth/teeth directly in the mouth. Impression/model scanner 651 may be used to scan castings of a patient's tooth/teeth, providing another way to get data to the dental processing computer 652. A variety of scanning systems exist, including, but not limited to, the True Definition Scanner (3M Corporation of Maplewood, Minn., USA). Additional scanners may be used to obtain color information about the patient's natural tooth color and/or skin color. This data may be retrieved by scanning the tooth and skin and determining an average color value stored, for example, in an RBG format. This information is entered into dental data processing computer 652. Dental data processing computer 652 comprises one or more processors and memory containing instructions for implementing functionality of system 600. Alternatively, the instructions may be stored on computer readable storage media of a computer program product, such as a CD-ROM, DVD-ROM, etc. Dental data processing computer 652 may receive data in a variety of formats, including, but not limited to, the STL file format. The dental data processing computer may add additional features to the STL file, such as alignment marks and/or tooth indicators, and produce a modified STL file. This modified STL file may then be converted by a slicer module executing on the dental data processing computer to output a file representing instructions for the fabricator 654.

In some embodiments, software may be used, allowing a user to define the configuration of the brace. Examples of software that may be suitable, include Sirona Dental Systems, Inc. (Long Island City, N.Y.) Cerec inLab software, 3Shape Software North America (Warren, N.J.) 3Shape Dental System™ CAD/CAM software, Motion View Software, LLC (Hixson, Tenn.) OrthoInsight 3D Software. as well as multiple other applications. Computer aided design (CAD) software has the option of creating a library of orthodontic braces that can be re-used multiple times by the user. If the user makes a new brace design, it can be stored in the library for future cases. The brace would be aligned on the veneer/crown/bridge surfaces and scaled to fit a new case.

In some embodiments, the fabricator 654 may include, but is not limited to, a 3D printer (additive manufacturing), or a milling machine (subtractive manufacturing). In the case of a 3D printer, G-code instructions may be provided by the dental data processing computer 652 to be executed by the 3D printer to produce a veneer. An example 3D printer is the Varseo 3D Printer (BEGO GmbH & Co. KG of 28359 Bremen in Germany).

The veneer (or crown or bridge) can be fabricated from one or more materials. In embodiments, the veneer (or crown or bridge) and brace portion is made of Polymethyl-methacrylate (PMMA) material. In some embodiments, the veneer and brace are made from Celtra Duo milling blocks (Dentsply, York, Pa.). An advantage of the Celtra Duo material is its ability to hand polish (in mouth or on lab bench) or glaze-fire to make it stronger. The user would use the Celtra Duo in its raw state to align teeth, and after orthodontic correction, tap off the crowns or bridges to polish or glaze-fire. After polishing or glazing, the user would adhere the final/provisional veneer (crown or bridges). If the veneer (or crown or bridge) could not be easily tapped off without breakage, the user could perform the brace removal/polishing, etc. in the mouth. In embodiments, the brace is milled or printed from the same material as the veneer, crown, or bridge.

Braces may be placed on the mesial (between teeth-anterior), distal (between teeth-posterior), buccal (lateral surfaces), lingual (tongue side), and/or occlusal surfaces (top of tooth—chewing surfaces) of the underlying veneer (or crown, or bridge). The veneer (or crown or bridge) and the brace is milled or printed out of the same material, so there is no need for bonding the brace to the veneer (or crown or bridge). Veneers may have reservoirs (see 120 of FIG. 1B) for holding a greater amount of adhesive. The user has the option to create the reservoir(s) in the computer aided design software, or design the case without any reservoirs.

Figure 7:
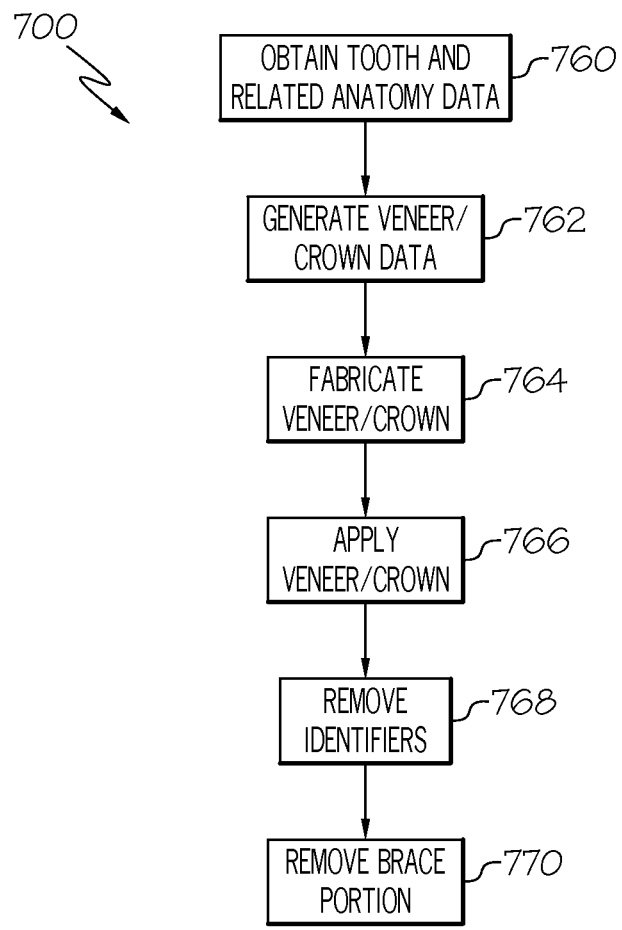
FIG. 7 is a flowchart indicating process steps for embodiments of the present invention.

FIG. 7 is a flowchart 700 indicating process steps for embodiments of the present invention. In process step 760, tooth data and related anatomy is obtained. The tooth data may include shape data and color data. The shape data may be obtained by scanning a casting of teeth, or by scanning of teeth directly. In process step 762, veneer and/or crown data is generated. This data may include, but is not limited to, addition of alignment marks, addition of tooth identifiers, addition of the brace portion in the desired position on the veneer, thickness of the veneer, and color information. In process step 764, the veneer/crown/bridge is fabricated, which may include printing with a 3D printer. The 3D printer may utilize provided color information to determine which spool of material is most appropriate to fabricate the veneer. The 3D printer may add horizontal axis alignment marks, vertical axis alignment marks, and/or tooth identifiers. In process step 766, the veneer and/or crown is applied to a patient's tooth. The veneer/crown/bridge may be applied using industry-standard composite-based materials that are currently used to cement temporary crowns or braces. In process step 768, tooth identifiers are optionally removed by polishing of elevated features and/or filling of indentations. Wires and bands may then be attached to start the orthodontic process. Once the orthodontic process completes, which may occur many weeks or months later, the orthodontic wires and bands are removed, and then the brace portions may be removed in process step 770. The brace portions may be removed by grinding, filing, and/or polishing the brace portion such that it is relatively flush with the tooth portion of the veneer. Once the brace portion is removed, the dentist can add sealant to add some glaze to the tooth, and then add some scoring, ripples, and other imperfections to make the veneer resemble the surface of a real human tooth. Note that while embodiments have been disclosed herein, they are not exhaustive, and other embodiments are possible and within the scope of the present invention. For example, in some embodiments, the veneers are milled instead of 3D printed.

Embodiments of the present invention provide the features and advantages of utilization of a provisional material that creates a temporary, natural-looking veneer once the teeth have been orthodontically moved. Another feature is the brace serves as a purchase point or handle on the tooth. In embodiments, the veneer that remains behind once the brace portion is removed allows the patient to try out their new orthodontically corrected smile with a tooth color that may be lighter or darker per the patient's preference and the recommendation of the dentist. If a patient has a very small or malformed tooth, the dentist can correct the morphology or shape, width, and height of the tooth, and add a virtual orthodontic brace via software operating on the dental data processing computer. A small peg lateral may be designed with the software. The brace portion is then added to a more ideal veneer, (or crown or bridge). After the design phase above, the virtual veneer (or crown or bridge) is milled or printed in exact dimensions as planned.

An exemplary workflow includes fabrication of veneers as one integral piece. A doctor or laboratory technician may design veneers and braces utilizing computer aided design (CAD) software. Each veneer is customized for shape, ideal proportion, color, and orthodontic prescription. Once orthodontic correction is achieved, the brace portion of the veneer is removed, such as by using a high speed hand tool. A customized clear-colored fixed retention wire may be added to the veneer surface and covered with a tooth-colored flowable composite.

A patient may preferably wear the veneers for a period of about six to twelve months. After that time, the veneers may be removed and replaced by a different set of veneers or conventional retainers.

Figure 8A:
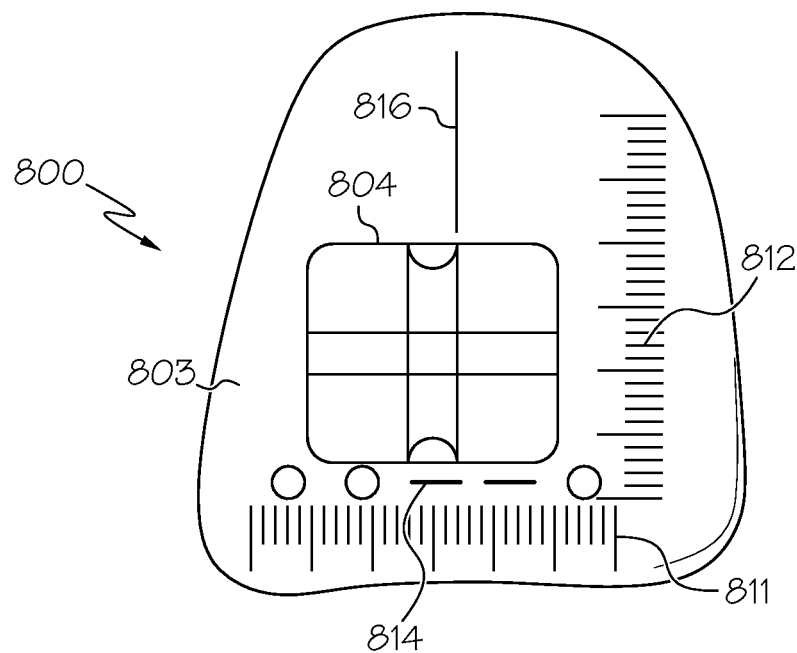
FIG. 8A shows a front view of a crown in accordance with embodiments of the present invention.
Figure 8B:
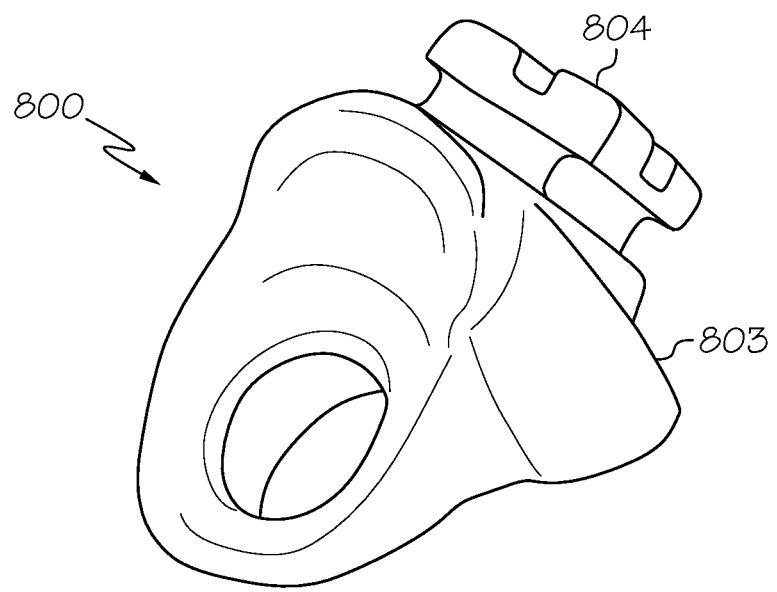
FIG. 8B shows a perspective view of a crown in accordance with embodiments of the present invention.
Figure 8D:
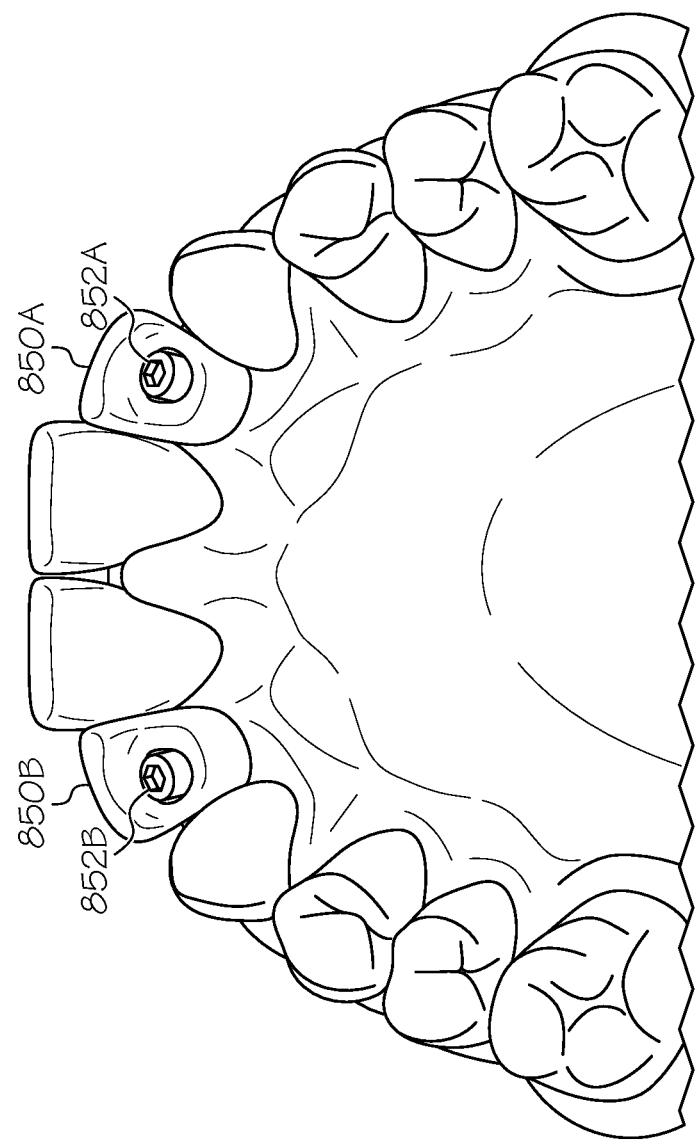
FIG. 8D shows the crowns installed over prepared teeth in accordance with embodiments of the invention.

FIGS. 8A-8D show an exemplary crown in accordance with embodiments of the present invention. FIG. 8 shows a front view of a crown 800 and FIG. 8B shows a back perspective view of the crown 800. Similar to the veneers previously described, the crown 800 comprises a tooth portion 803 and a brace (orthodontic) portion 804. Crowns 850A and 850B are applied/installed to prepared teeth 852A and 852B in the patient's mouth, as shown in FIGS. 8C and 8D. Two such crowns are shown therein, but in some embodiments, more or fewer crowns may be applied. In some embodiments, horizontal alignment marks 811 and vertical alignment marks 812 may be present on the crown (FIG. 8A) to aid in proper alignment of the crown. In some embodiments, the crown in accordance with the present invention includes the identification marks, combination marks, cross hairs, etc. described with regard to the veneer. In some embodiments, the crown in accordance with the present invention includes a tooth indicator 814.

Figure 9A:
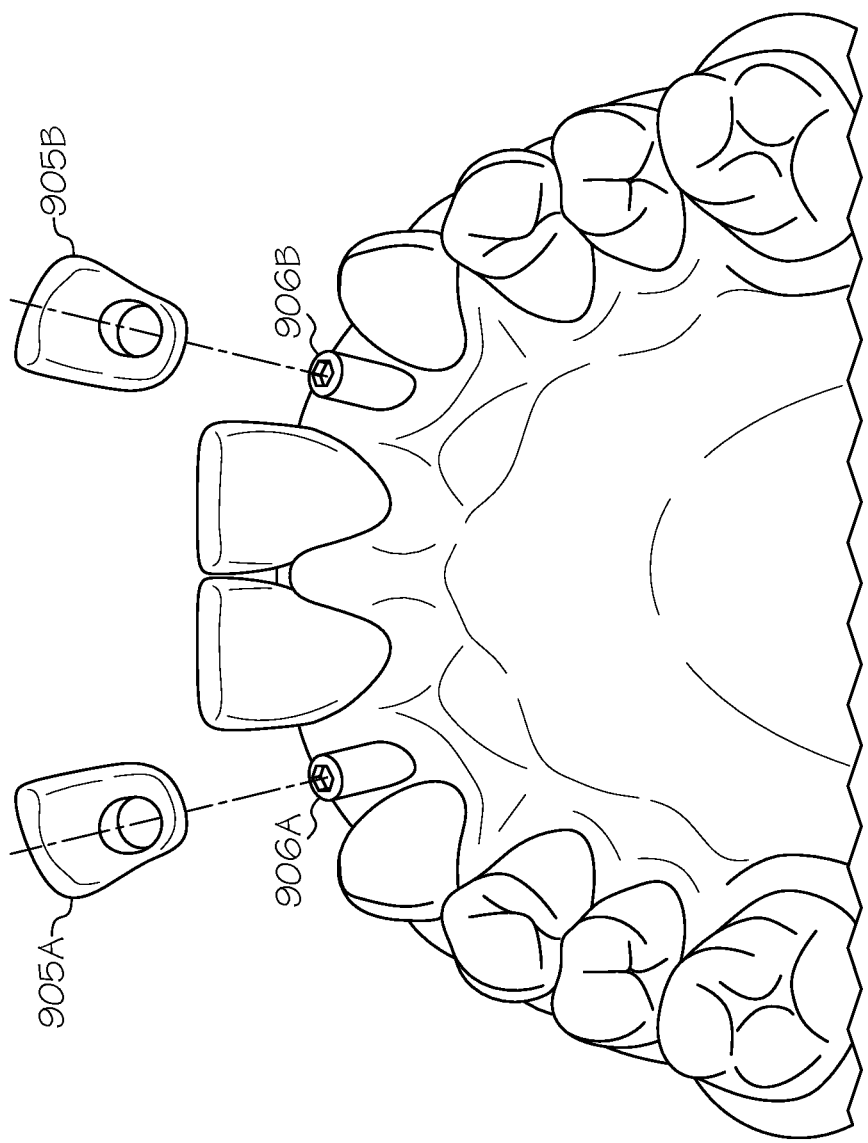
FIG. 9A shows installation of crowns to implant abutments used with embodiments of the present invention.
Figure 9B:
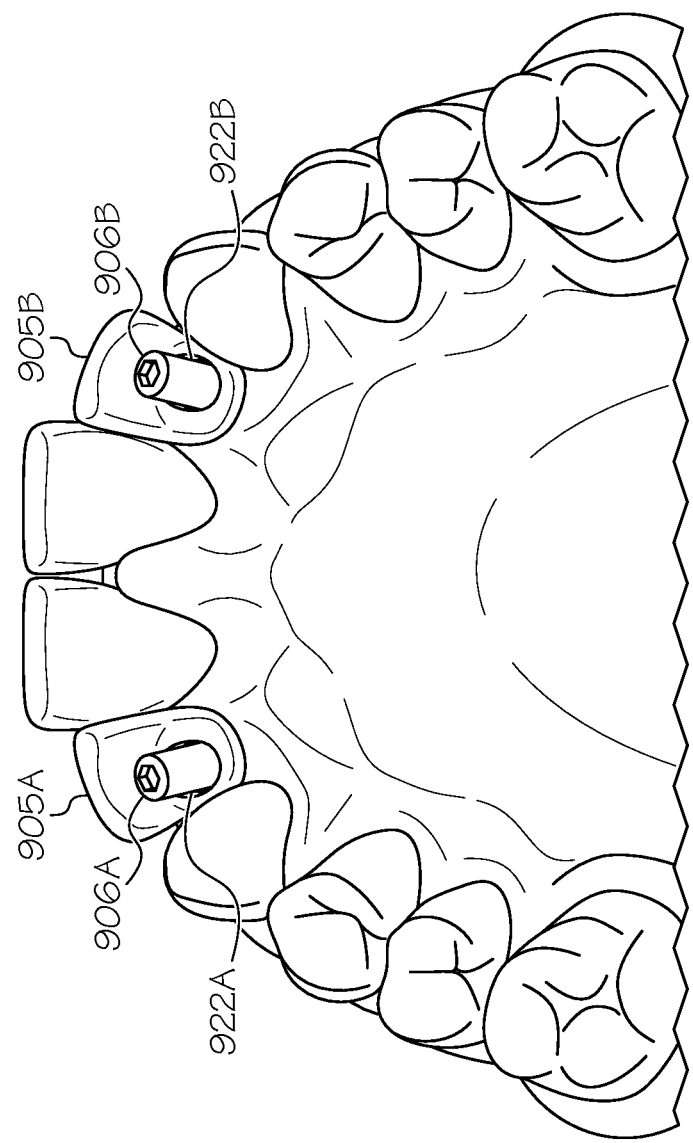
FIG. 9B shows the crowns installed over the implants.
Figure 9C:
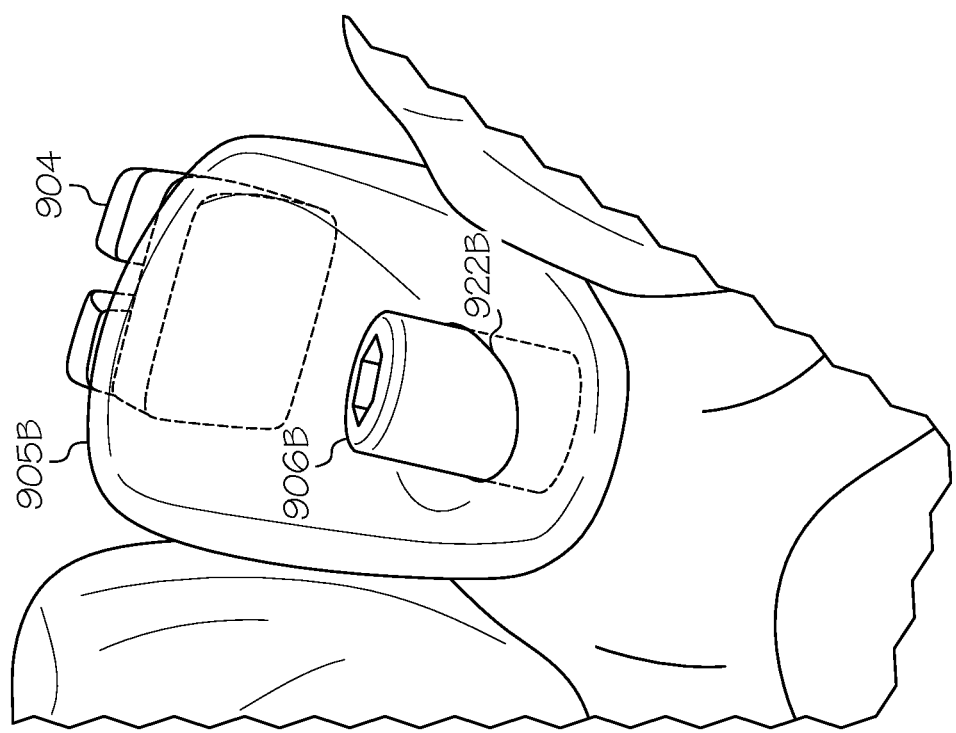
FIG. 9C shows a detailed view of a crown installed over an implant.

FIGS. 9A-9C show installation of a crown similar to crown 800 shown in FIG. 8. Referring to FIG. 9A, two crowns 905A and 905B are aligned with corresponding abutments (i.e. implants) 906A and 906B that are installed in a patient's mouth. FIG. 9B shows the crowns 905A and 905B placed on the respective abutments 906A and 906B. Two crowns are shown therein, but in some embodiments, more or fewer crowns may be applied. FIG. 9C shows a detailed view from behind a tooth (as viewed from inside the mouth) of crown 905B installed on abutment 906B. Abutments 906A (FIGS. 9A and 9B) and 906B protrude through apertures 922A (FIGS. 9A and 9B) and 922B. FIG. 9C also indicates the position of brace (orthodontic) portion 904 of the crown 905B. The crowns may be used for anchorage, and/or for esthetic purposes.

Figure 10:
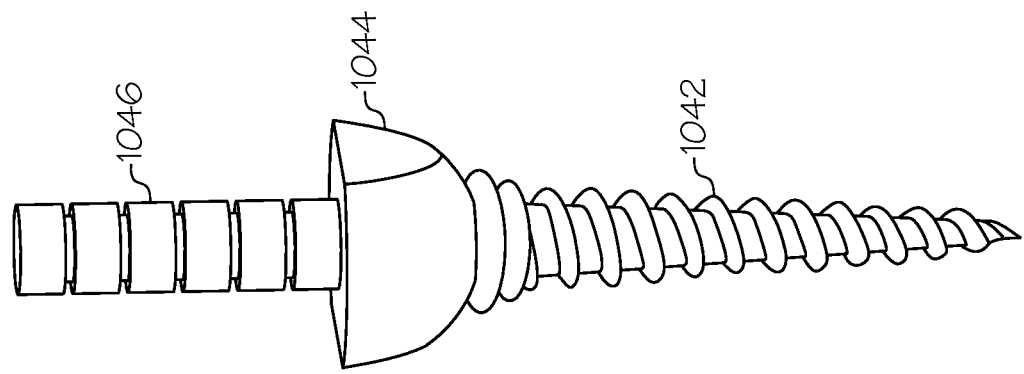
FIG. 10 shows an exemplary implant used with embodiments of the present invention.

FIG. 10 shows an exemplary implant used as an aperture like that of 922 in some embodiments of the present invention. The implant 1000 includes a threaded portion 1042 that secures to the patient's bone. A base portion 1044 is disposed on the threaded portion 1042. An abutment 1046 is disposed on the base portion 1046. An example of an implant, which could be used, is disclosed in U.S. Pat. No. 9,629,696 filed Jun. 6, 2014, the contents of which are incorporated herein by reference.

Figure 11:
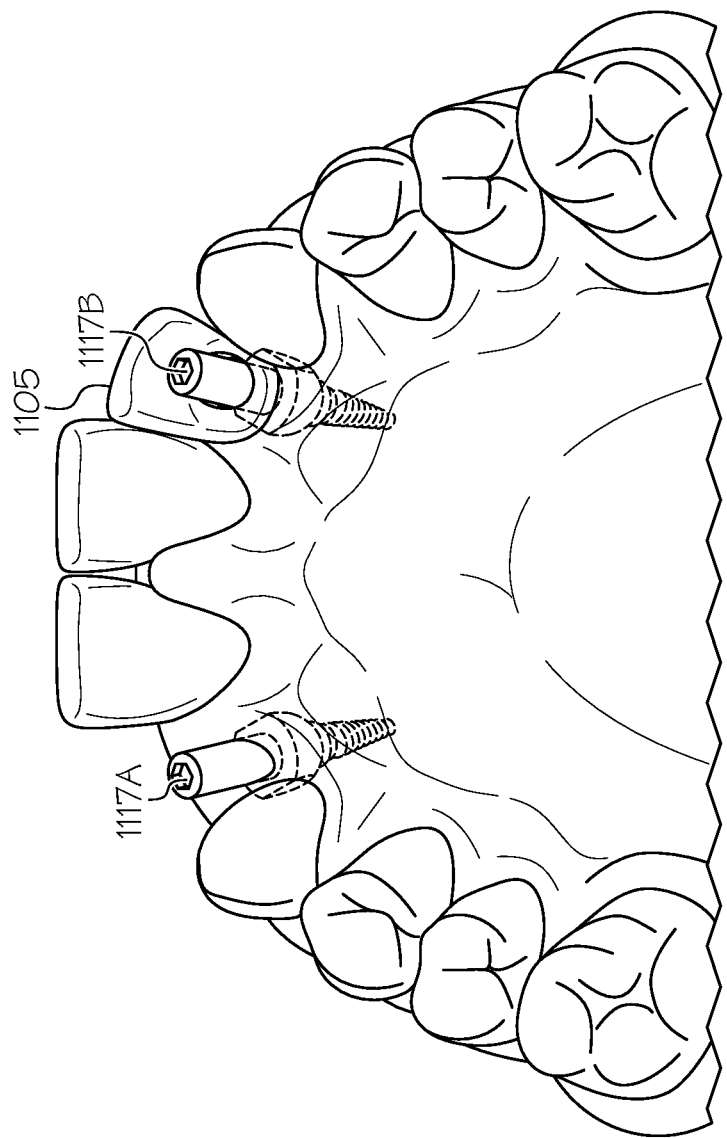
FIG. 11 shows an exemplary installation of a crown of FIG. 8 utilizing the implant of FIG. 10.

FIG. 11 shows an exemplary installation of a crown of FIG. 8 utilizing the implant of FIG. 10. The abutments 1117A and 1117B are placed in a palatal position. As shown with abutment 1117B, the crown 1105 fits over the abutment 1117B. A crown (not shown) may also be installed on abutment 1117A, and wherever else a crown is needed, depending on the patient's dental needs.

Figure 12A:
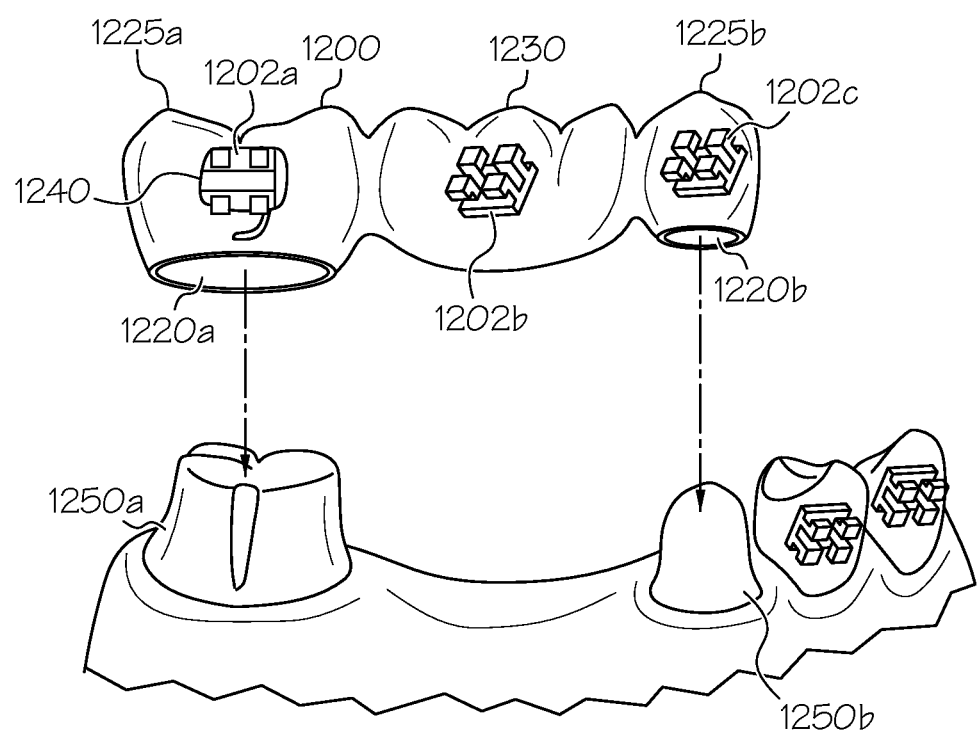
FIG. 12A shows a bridge and its installation in accordance with embodiments of the present invention.
Figure 12B:
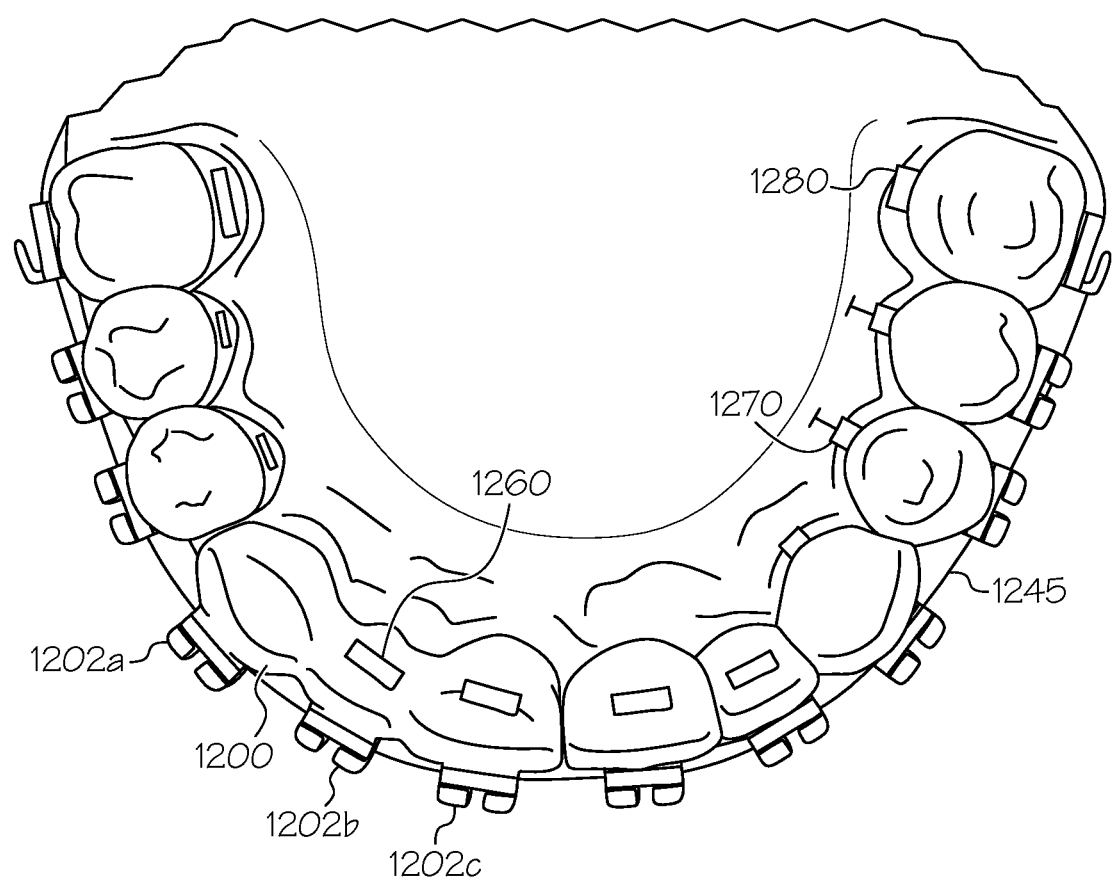
FIG. 12B shows the bridge installed in accordance with embodiments of the present invention.

FIGS. 12A and 12B show a bridge in accordance with embodiments of the present invention. If a patient is missing one or more teeth, a fixed bridge is a common restorative solution. The bridge 1200 has at least one integrated brace. In the example shown, there are three integrated braces 1202a, 1202b, and 1202c on the bridge 1200, which may be milled or printed from the same material as the tooth portions. The bridge typically includes at least two supporting teeth 1225a and 1225b, each having an opening 1220a and 1220b to attach to prepared teeth 1250a and 1250b. Between portions 1225a and 1225b is one or more pontics (i.e. replacement tooth) 1230. The pontic 1230 may be an ovate pontic used to sculpt the gum tissue where it touches the gum and underlying bone. The doctor uses a dental hand piece to prepare broken or carious teeth for a conventional bridge or an onlay bridge (open shell crown design) that allows occlusal surfaces to be exposed or not covered with material. This configuration is helpful when performing orthodontic correction and establishing the best possible final occlusion. As shown, archwire 1245 connects the braces to one another. The bridge in accordance with the present invention, in some embodiments, includes alignment markers, cross-hairs, and/or tooth indicators. In some embodiments, instead of the bridge attaching to a prepared tooth, the bridge is affixed to an implant like that described with respect to the crown.

Lingual braces may be included on the bridge. For example, the lingual bite blocks shown at 1260. Other types of lingual braces can be used as well on the teeth or the bridge, such as lingual elastic hooks, for example, at 1270, and lingual tube at 1280. Bridges will have the option for braces that can be designed and applied to the lateral, lingual (tongue) side, and chewing surfaces. In addition, an attachment design (seating or removal lug) may allow the doctor easily tap off a crown or bridge. This feature allows the doctor to buff off braces and make changes to a crown or bridge such as characterization, light-cured glazing and/or oven firing (makes material stronger). It is easier to work on a crown on the laboratory bench versus making these changes in the mouth. Heat treating would also not be possible in the mouth.

Figure 13A:
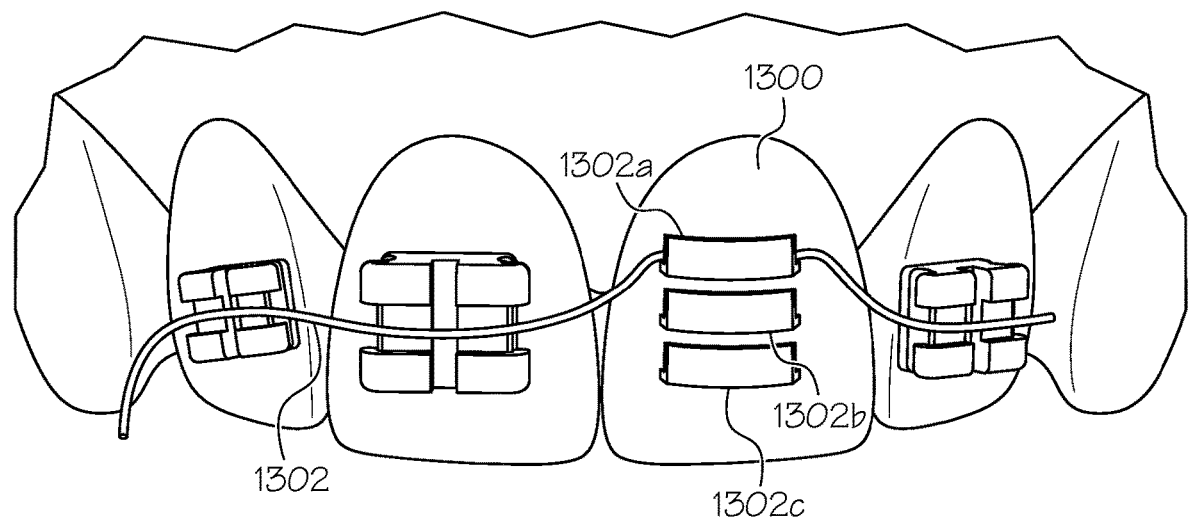
FIG. 13A shows a front view of a veneer having a brace in accordance with alternative embodiments of the present invention.
Figure 13B:
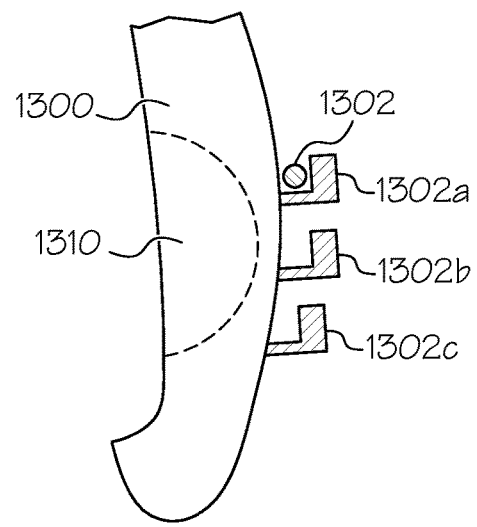
FIG. 13B shows a side view of a veneer having a brace in accordance with alternative embodiments of the present invention.

As shown in FIGS. 13A-13B, although a particular bracket/brace has been shown herein for purposes of disclosure, in other embodiments, other braces configurations are included within the scope and spirit of the invention. For example, the brace portion can instead resemble a "ladder rung" model. The brace can be comprised of a plurality of stepped or graduated orthodontic wire slots, i.e. "rungs," on the veneer 1300 (or bridge or crown). Examples of the wire slots are shown at 1304a-1304c. Archwire 1302 can be wrapped inside one or more of such slots according to the desired objective. For example the wire may be wrapped through a top rung 1302a in order to push the tooth/veneer down out of the bone (or up out of the bone). In practice, more or fewer than three slots may be included. A reservoir 1310 can be included in some embodiments.

This "ladder/rung" design feature could be used by the dentist to intrude or extrude a tooth (or teeth) from a patient's bone. An active archwire (one that is deflected upward or downward i.e.: archwire is loaded) in one of the slots to create an extrusion or intrusion force. After 4 to 6 weeks the tooth will move downward (or upward) 0.5 to 1 mm. At that time the same archwire is then moved upward or downward to the next step-slot to reactivate the wire, creating the same force system to move the tooth up or down. A tooth could be eventually extracted orthodontically with this concept. The implant dentist often uses hopeless teeth (ones to be later extracted) to build more bone. In other words, the moving tooth will bring new bone with it as it is orthodontically distracted (moved downward). The stair-step slots are designed to hold the wire without having to ligate the wire in place. The design of the stair-step wire snap-in slots allow the wire to be placed such that the upward or downward forces will mechanically lock the wire into the brace without the need for a ligature tie.

The process being described is a form of orthodontic distraction or extrusion when the doctor orthodontically extracts a hopeless tooth. As the tooth is extruded new bone is formed. If the doctor extracts the tooth a large void (no bone) is created. It takes several months of waiting for new bone to form that sometimes does not happen. Also bone grafting would be required for many cases. This increases cost to the patient. Orthodontic extrusion is frequently used to prepare better implant sites. The user could design the ladder/rungs to be a specific measurement (e.g., 0.5-1 millimeter (mm) apart). Thus, the tooth could be moved 0.5 to 1 mm between each appointment (4-6 weeks). This is a more precise method of extruding or intruding teeth. Using CAD software to design an orthodontic prescription allows the doctor to precisely plan the amount of tooth movement for individual teeth. Currently orthodontic appliances have specific prescriptions built into the brackets and tubes, such as angulation on the bonding pad, root tip, depth of bracket slot, rotation arms, torque and other biomechanical orthodontic concepts. The user can add biomechanical design features to any veneer, crown, or bridge with CAD software.

In some embodiments, an orthodontic solution for a patient may include only installation of one or more veneers of the present invention. In some embodiments, a solution may include installation of one or more crowns of the present invention. In some embodiments, a solution may include installation of one or more bridges of the present invention. In some embodiments, a solution may include installation of a combination of at least one veneer, at least one crown, and/or at least one bridge of the present invention. So, for example, one crown and two veneers may be installed to a patient's mouth. In another example, two crowns, six veneers and one bridge, each according to the present invention may be installed in a patient's mouth.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above-described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. The flow diagrams depicted herein are provided by way of example. There may be variations to these diagrams or the steps (or operations) described herein without departing from the spirit of the invention. For instance, in certain cases, the steps may be performed in differing order, or steps may be added, deleted, or modified. All of these variations are considered a part of the present invention as recited in the appended claims.

What is claimed is:

1. A 3D-printed dental appliance comprising a veneer and a brace, wherein the veneer and the brace of the dental appliance are formed of a contiguous single piece of material without a separate bonding material between the veneer and the brace, wherein the 3D-printed dental appliance is configured to cover a front surface, mesial surface and distal surface of the tooth, and is further configured to cup an incisal edge of the tooth;
   wherein a front side of the veneer comprises a cross-hair pattern, such that a vertical line of the cross-hair pattern is aligned with a zenith point of the veneer, wherein the zenith point denotes the highest vertical area at the top of the veneer when installed and framed by gum tissue, wherein the cross-hair pattern is indented into the front side of the veneer;
   wherein a bottom edge of the front side of the veneer comprises a first plurality of raised or indented alignment markers approximately one millimeter apart,
   wherein a side edge of the front side of the veneer comprises a second plurality of raised or indented alignment markers approximately one millimeter apart;
   wherein the first plurality of alignment markers and the second plurality of alignment markers are disposed at an approximately 90 degree angle to one another; and
   wherein the front side of the veneer resembles a front side of a tooth, other than: the cross hair pattern, the first plurality of raised or indented alignment markers, and the second plurality of raised or indented alignment markers.

2. The dental appliance of claim 1, wherein the veneer comprises thereon, on the front side, a set of binary-coded tooth identifiers.

3. The dental appliance of claim 2, wherein the set of binary-coded tooth identifiers represents codes of 0's and 1's.

4. The dental appliance of claim 2, wherein the set of binary-coded tooth identifiers is comprised of lines and circles.

5. The dental appliance of claim 1, wherein the brace comprises a plurality of graduated orthodontic wire slots stacked vertically on the front side of the veneer.

6. The dental appliance of claim 5, wherein the plurality of graduated orthodontic wire slots comprises includes three wire slots.

7. The dental appliance of claim 5, wherein each of the plurality of graduated orthodontic wire slots comprises:
   a first wall extending perpendicularly from the front side of the veneer, and
   a second wall extending perpendicularly from the first wall.

8. The dental appliance of claim 1, wherein a backside of the veneer comprises a reservoir.

9. A 3D-printed dental restoration comprising a crown and a brace, wherein the crown and the brace of the dental restoration are formed as a contiguous single piece of material without a separate bonding material between the crown and the brace;
   wherein a front side of the crown comprises a raised or indented cross-hair pattern, such that a vertical line of the cross-hair pattern is aligned with a zenith point of the crown, wherein the zenith point denotes the highest vertical area at the top of the crown when installed and framed by gum tissue;
   wherein a bottom edge of the front side of the crown comprises a first plurality of raised or indented alignment markers approximately one millimeter apart,
   wherein a side edge of the front side of the crown comprises a second plurality of raised or indented alignment markers approximately one millimeter apart;
   wherein the first plurality of alignment markers and the second plurality of alignment markers are disposed at an approximately 90 degree angle to one another; and
   wherein the front side of the crown resembles a front side of a tooth, other than: the cross hair pattern, the first plurality of raised or indented alignment markers, and the second plurality of raised or indented alignment markers.

10. The dental appliance of claim 9, wherein the crown comprises thereon, on the front side, a set of binary-coded tooth identifiers.

11. The dental appliance of claim 10, wherein the set of binary-coded tooth identifiers represents codes of 0's and 1's.

12. The dental appliance of claim 10, wherein the set of binary-coded tooth identifiers is comprised of lines and circles.

13. The dental appliance of claim 9, wherein the brace comprises a plurality of graduated orthodontic wire slots stacked vertically on the front side of the crown.

14. The dental appliance of claim 13, wherein the plurality of graduated orthodontic wire slots comprises includes three wire slots.

15. The dental appliance of claim 13, wherein each of the plurality of graduated orthodontic wire slots comprises:
   a first wall extending perpendicularly from the front side of the crown, and
   a second wall extending perpendicularly from the first wall.

16. A 3D-printed dental restoration comprising a bridge and a brace, wherein the bridge and the brace of the dental restoration are formed as a contiguous single piece of material without a separate bonding material between the bridge and the brace;
   wherein a front side of the bride comprises a raised or indented cross-hair pattern, such that a vertical line of the cross-hair pattern is aligned with a zenith point of the bridge, wherein the zenith point denotes the highest vertical area at the top of the bridge when installed and framed by gum tissue;
   wherein a bottom edge of the front side of the bridge comprises a first plurality of raised or indented alignment markers approximately one millimeter apart,
   wherein a side edge of the front side of the bridge comprises a second plurality of raised or indented alignment markers approximately one millimeter apart;
   wherein the first plurality of alignment markers and the second plurality of alignment markers are disposed at an approximately 90 degree angle to one another; and
   wherein the front side of the bridge resembles a front side of a tooth, other than: the cross hair pattern, the first plurality of raised or indented alignment markers, and the second plurality of raised or indented alignment markers.

17. The dental appliance of claim 9, wherein the bridge comprises thereon, on the front side, a set of binary-coded tooth identifiers.

18. The dental appliance of claim 17, wherein the set of binary-coded tooth identifiers represents codes of 0's and 1's.

19. The dental appliance of claim 17, wherein the set of binary-coded tooth identifiers is comprised of lines and circles.

20. The dental appliance of claim 16, wherein the brace comprises a plurality of graduated orthodontic wire slots stacked vertically on the front side of the bridge.

21. The dental appliance of claim 20, wherein the plurality of graduated orthodontic wire slots comprises three wire slots.

22. The dental appliance of claim 16, wherein each of the plurality of graduated orthodontic wire slots comprises:
   a first wall extending perpendicularly from the front side of the bridge, and
   a second wall extending perpendicularly from the first wall.

* * * * *